United States Patent

Summerville, Jr. et al.

[11] Patent Number: 5,251,504
[45] Date of Patent: Oct. 12, 1993

[54] AUTOMATIC TRANSMISSION

[76] Inventors: Andrew G. Summerville, Jr., 75 Grove St., Clinton, Conn. 06413; Albert V. Mirto, Jr., 3 Pioneer Dr., North Branford, Conn. 06471

[21] Appl. No.: 922,510
[22] Filed: Jul. 31, 1992
[51] Int. Cl.$^5$ ............................................. F16H 3/08
[52] U.S. Cl. ....................................... 74/368; 74/366; 280/238
[58] Field of Search ................ 74/366, 368; 280/236, 280/238

[56] References Cited

U.S. PATENT DOCUMENTS

| | | | |
|---|---|---|---|
| 598,863 | 2/1889 | Evans | 74/366 X |
| 707,359 | 8/1902 | Scharbach | 280/238 |
| 714,614 | 11/1902 | Scognamillo et al. | 74/366 |
| 1,045,151 | 11/1912 | Johnson | 74/366 |
| 1,047,735 | 12/1912 | Boucher | 74/366 |
| 1,059,275 | 4/1913 | Chambers et al. | 74/366 |
| 3,349,636 | 10/1967 | Colpo | 74/368 |
| 3,863,503 | 2/1975 | Loeb et al. | 280/238 X |
| 4,005,611 | 2/1977 | Jeffries | 280/236 X |
| 4,447,068 | 5/1984 | Brooks | 280/238 X |
| 5,136,892 | 8/1992 | Ochs | 280/238 X |

Primary Examiner—Dirk Wright
Attorney, Agent, or Firm—John R. Doherty

[57] ABSTRACT

An automatic transmission is provided for driving a rotating wheel having an axle mounted onto a support frame and especially a bicycle frame. The transmission comprises a power input means such as a dual crank-pedal mechanism attached to the frame for receiving power input along with a drive shaft. A plurality of driving elements are mounted for rotation freely about the drive shaft and have engagement means such as sprockets on the surface thereof, one of the driving elements being a lead driver connected to the drive shaft for driving rotation in one direction along with the drive shaft, the driving elements being located at successively greater distances along the shaft from the axle with the lead driver being the farthest from the axle. A drive plate is coupled to the rotating wheel and has on its surface a plurality of concentrically arranged engagement means such as holes which mate with the sprockets on the driving elements for transmitting rotational power from the drive shaft to the drive plate. Means are provided for transferring torsional thrust between the plurality of driving elements and for applying an axial load to the plurality of driving elements along the drive shaft.

26 Claims, 6 Drawing Sheets

AUTOMATIC TRANSMISSION

BACKGROUND OF THE INVENTION

This invention relates to automatic power transmissions in general, and especially to automatic bicycle power transmissions.

Bicycles have employed chain and sprocket type transmissions for many years now. Typically, they include an array of sprockets mounted on both driver and driven shafts. These sprockets offer the rider a selectable choice of drive ratios thereby allowing the rider to taylor the drive to his or her own level of comfort or ability. The chain which transfers power from the driver to the driven shaft is shifted by means of a "derailleur" mechanism which moves the chain laterally from sprocket to sprocket. Although this drive system is highly efficient, light weight, cost effective and simple, it nevertheless possesses a number of tangible shortcomings and disadvantages.

One such disadvantage, for example, is the relative complexity of the derailleur type transmission. Each lateral movement of the chain from one sprocket to another requires a corresponding compensation in the length of the chain. This unfortunately necessitates the use of a self-adjusting type tensioner which adds further complexity to the design. Moreover, any slight misalignment of the cable driven front and rear derailleur mechanisms can create an inefficient "between gears" condition.

Another disadvantage of the derailleur type transmission is that when undergoing a sprocket change, the lateral movement of the chain creates a discontinuity in the power transmission to the rear wheel which results in a loss of propulsive force.

Still another disadvantage is the difficulty of bringing the bicycle up to speed upon acceleration from a standstill position where the rider happens to be in a high gear mode instead of a low gear mode. In such cases, the bicycle must be in forward motion to effect a gear change to a lower gear, which is of course after the fact.

A further disadvantage is that the rider must constantly make manual gear changes to compensate for variable loading conditions resulting from external factors including, but not limited to, road inclination, tire pressure and windage, for example.

A still further disadvantage of the derailleur type transmission is simply that many people find it difficult to understand how the gears operate and therefore avoid these bicycles altogether.

It is therefore an important object of the invention to provide an improved automatic transmission system.

Another object of the invention is to provide an improved automatic transmission system which is an alternative for the present day bicycle derailleur type transmissions.

Another object of the invention is to provide a self-regulating and automatic bicycle transmission which is simple in design and operation.

Still another object of the invention is to provide such an automatic bicycle transmission while maintaining high levels of power efficiency.

A further object of the invention is to provide such an automatic bicycle transmission which is light-weight, economical and inexpensive to manufacture.

SUMMARY OF THE INVENTION

The present invention is directed to an automatic transmission which offers significant advantages over prior art systems. The automatic transmission of the invention is particularly well suited as an alternative for the conventional derailleur type bicycle transmission. The present transmission is simple and far less complicated than derailleur type transmissions, offers non-interrupted flow of power and can maintain a selectable, constant level of input torque.

Broadly, an automatic transmission according to the invention includes a power input means such as a conventional dual crank-pedal mechanism, which is mounted to a frame supporting a rotating wheel having an axle secured to the frame. A drive shaft is rotatably mounted to the frame and means are provided for transmitting power input from the power input means to the drive shaft causing the drive shaft to rotate.

A plurality of driving elements are mounted for rotation freely about the drive shaft in either or both a clockwise or counter clockwise direction with respect to the shaft, each of the driving elements having engagement means on the surface thereof. One of the driving elements, which serves as a lead driver, is connected to the shaft for driving rotation in one direction, i.e., the drive direction, along with the drive shaft. The driving elements are preferably located at successively greater distances along the drive shaft from the axle, with the lead driver being the farthest from the axle.

A drive plate is coupled to the rear wheel and has a surface extending outwardly away from the axle. The drive plate has on its surface a plurality of concentrically arranged engagement means which mate simultaneously with the engagement means of the driving elements for transmitting rotational power from the drive shaft to the drive plate.

Means are provided for applying an axial load to the plurality of driving elements along the drive shaft. The plurality of driving elements are further provided with means for transferring rotational thrust between adjacent driving elements upon application of the axial load.

In a more specific aspect, the drive shaft is supported at the axle, i.e., the rear axle in the case of a bicycle, by a thrust bearing whose support is actually affixed to the axle stud. This mounting technique is important in that it offers a critical base or datum plane from which the remaining parts of the transmission can be built. The opposite end of the shaft is supported by a similar thrust bearing which is in turn supported by a weldment affixed to the frame.

The drive shaft is driven in rotation by a bevel gear set or the like, whose driver is coupled to the dual crank mechanism and whose driven pinion is coupled to the shaft.

The driving elements used in the automatic transmission of the invention may be a series of sprockets, gears or other such devices which are mounted on the drive shaft starting at the thrust bearing located at the axle and working forward toward the crank spindle. The sprockets, for example, are designed such that they drive in one direction and spin freely in the other direction. Special supports in the form of "spools" cradle each drive sprocket.

Each spool in turn comprises a sleeve bearing in its axial center such that it will spin freely in either a clockwise or counter clockwise direction on the drive shaft.

Between each spool a torsion disk is placed which permits a torsional coupling to the spools.

The drive may comprise any number of sprockets in side by side relation in the form of a stack and their diameters may be uniform or progressively larger or smaller from one end of the stack to the other. The stack may therefore be in the form of a cylinder, a cone, or any other definable form such as a parabola, hyperbola, etc.

At the end of the stack farthest from the axle, the leading sprocket is clutched to the drive shaft in the driving direction, albeit like the other sprockets, it is allowed to overrun in the opposite direction. When the stack is placed under axial load and the leading sprocket is driven in rotation, the remaining sprockets will follow the leading sprocket.

A drive plate is coupled to the wheel, i.e., the rear wheel in the case of a bicycle, with its major axis concentric to the wheel. The drive plate is coupled to the wheel using a drive mechanism having overrunning capabilities similar to those of conventional bicycle drives. The drive plate engages all of the driving sprockets simultaneously, via a series of holes provided in the surface of the plate. The holes are arranged in circular patterns which are concentric about the axle of the wheel.

The power output to the wheel is a result of one or more contributing sprockets which act in a mechanical series circuit. By varying the axial load applied to the driving elements or sprockets, the rider may alter the input torque requirements to his or her own level of comfort or ability. The input torque then becomes essentially constant within the constraints of the system.

The automatic transmission of the invention offers the advantages of continuous driving force to the rear wheel and the power of self-regulation and control. This unique mechanical format promises to be an improved and economically viable alternative to present day derailleur systems.

DESCRIPTION OF THE PREFERRED EMBODIMENTS

Figure 1:
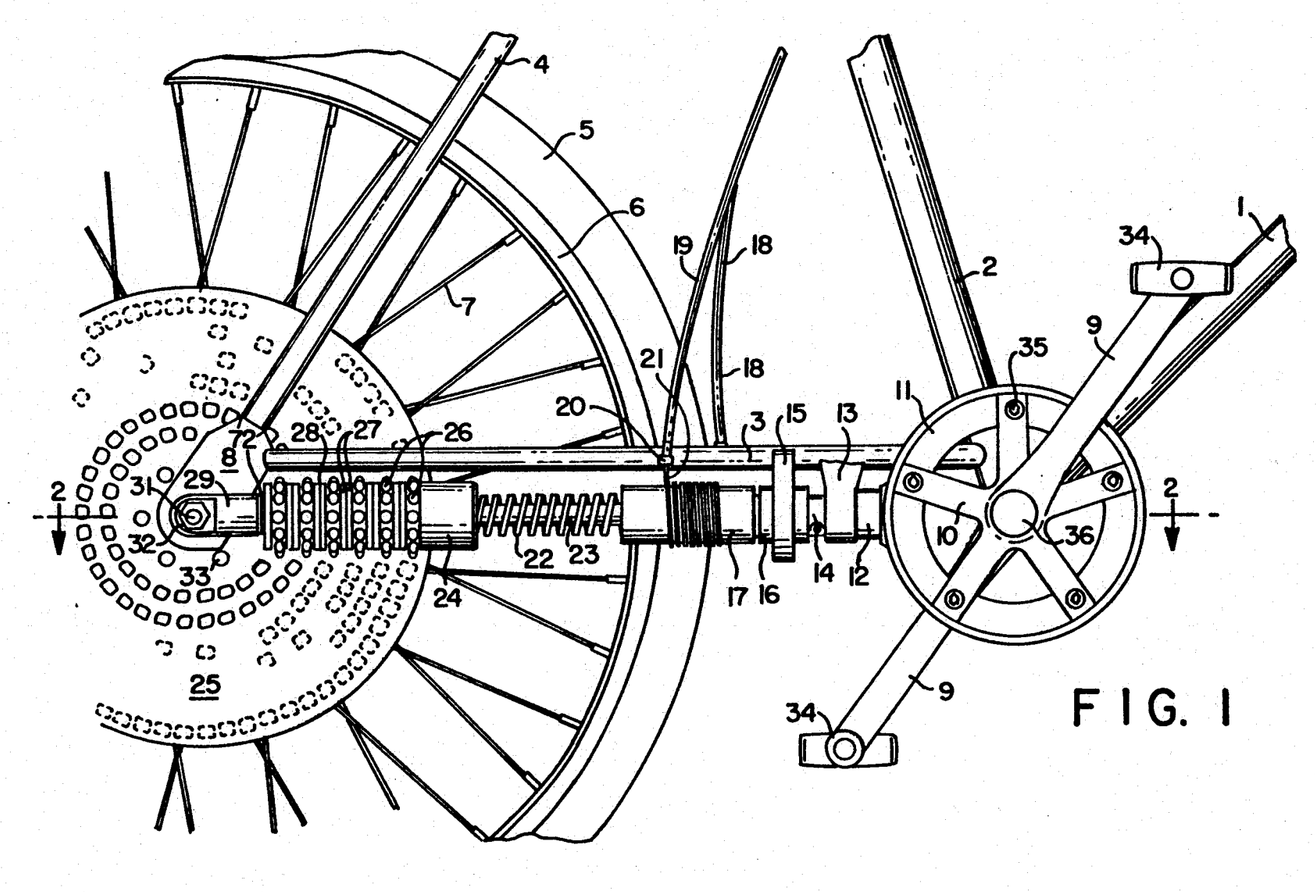
FIG. 1 is a side elevational view of a bicycle equipped with an automatic transmission according to the invention.
Figure 2:
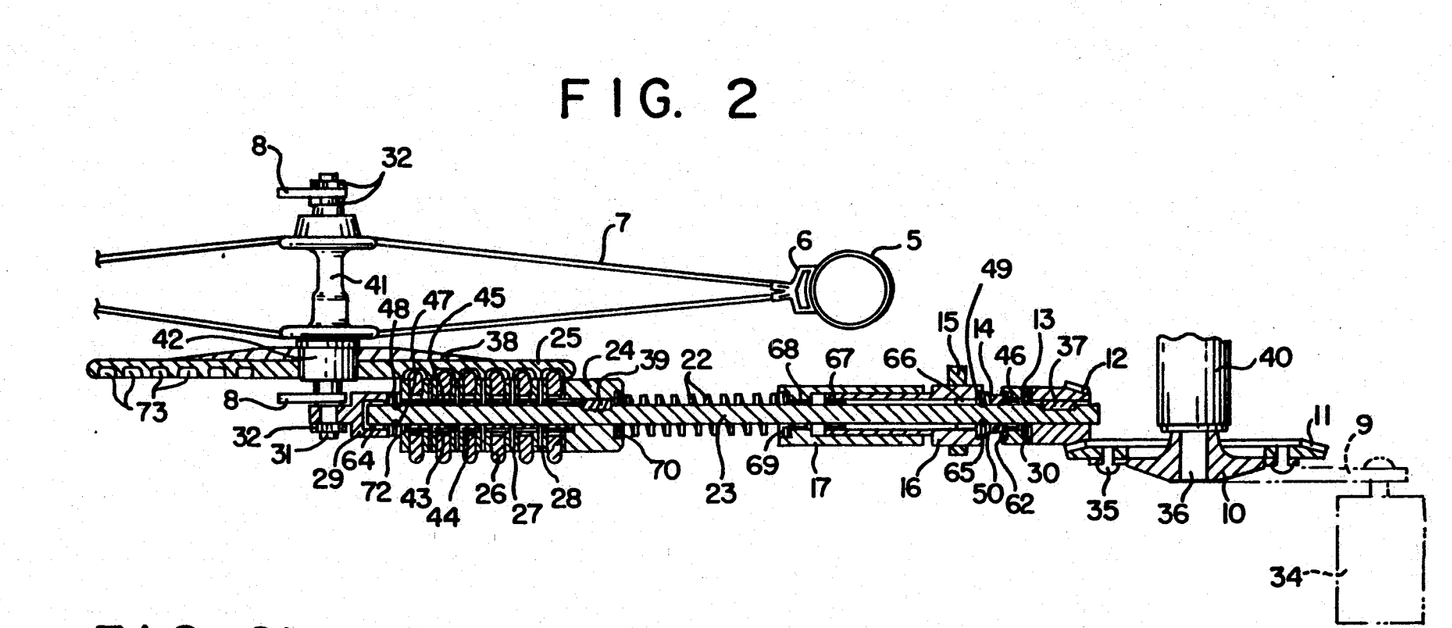
FIG. 2 is a top plan view in section of the automatic transmission shown in FIG. 1.

Referring now to the drawings and particularly to FIGS. 1 and 2, it may be seen that the device herein is mounted onto a bicycle frame comprising a down tube 1 joined to the seat tube 2 at the crank hanger 40. Chainstays are provided and are elevated slightly to facilitate mounting of the device. The chainstays 3 join seatstays 4 at the dropout plates 8.

With the frame as described, crank hanger 40 supports the crank spindle 36 allowing it to rotate in a normal manner. Pedals 34 are coupled to crank arms 9 which are in turn coupled to crank spindle 36. Crank coupling 10 links crank spindle 36 to bevel gear 11 through screw fasteners 35 holding bevel gear 11 concentric to crank spindle 36.

Bevel gear 11 engages bevel pinion 12 which is supported by drive shaft 23 in turn supported by bearing 46 at front bearing support 13, and by bearing 64 at rear bearing support 29.

With drive shaft 23 thus supported, bevel pinion 12 interfaces a first thrust bearing assembly 30 supported by bearing support 13.

Figure 2A:
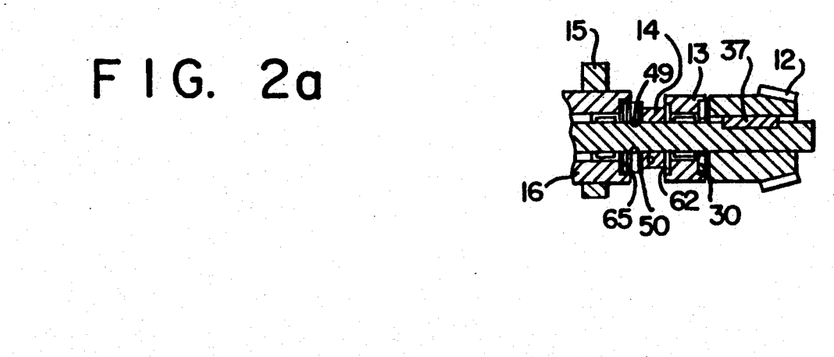
FIG. 2a is an enlarged, fragmentary, sectional view of part of the automatic transmission shown in FIG. 2.

A series of components are then sequentially mounted on drive shaft 23 starting at bearing support 13. They are, thrust washer 62 followed by clamping collar 14, followed by thrust washer 50, and in turn by retaining ring 49 (see FIG. 2a), bearing against a second thrust bearing assembly 65, supporting jack base tube 16, riding on shell bearings 66 and 67, and supporting jackstay 15. Jack base tube 16 makes threaded engagement with jack extension tube 17 stabilized by another shell bearing 68. Jack extension tube 17 then interfaces a third thrust bearing assembly 69, in turn interfacing with compression spring 22, in turn contacting a fourth thrust bearing assembly 70 bearing on lead sprocket driver 24.

Figure 4:
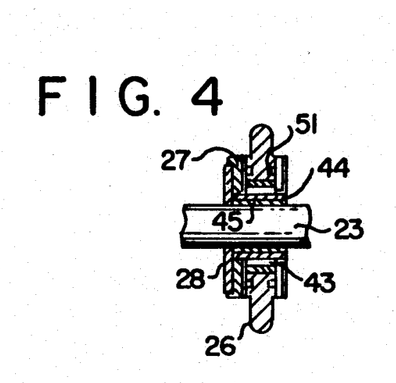
FIG. 4 is a sectional view of the drive sprocket taken along the lines 4—4 of FIG. 3.
Figure 11:
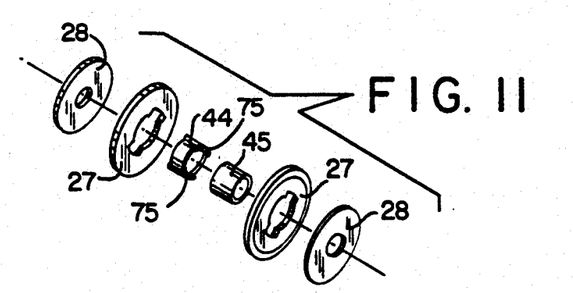
FIG. 11 is an exploded view of the three piece loading spool design.

With lead sprocket driver 24 coupled to drive shaft 23 through key, spline or polygon form 39, the driver engages load bearing hub 44 which rides on sleeve bearing 45 (see FIG. 4). Load bearing hub 44 is a component part of a three piece loading spool design as depicted by FIG. 11.

Referring now back to FIGS. 1 and 2, it may be seen that load bearing hub 44 supports drive sprocket 26 through shell type overrunning clutch 43. (This type of clutch is commercially available through manufacturers such as The Torrington Company, or INA Bearing Company, Inc.) Bearing hub 44 then engages loading flange 27 which interfaces torsion disk 28.

Figure 2B:
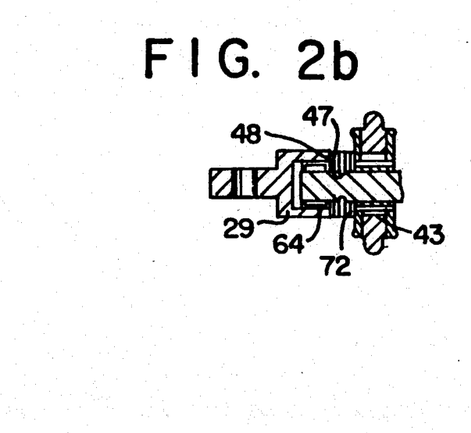
FIG. 2b is a similar view of another part of the automatic transmission shown in FIG. 2.
Figure 3:
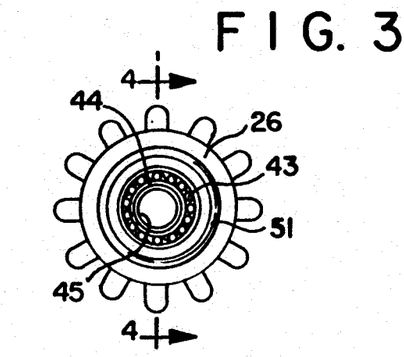
FIG. 3 is an enlarged elevational view of a typical sprocket used in the automatic transmission shown in FIG. 2.
Figures 6, 7, 8:
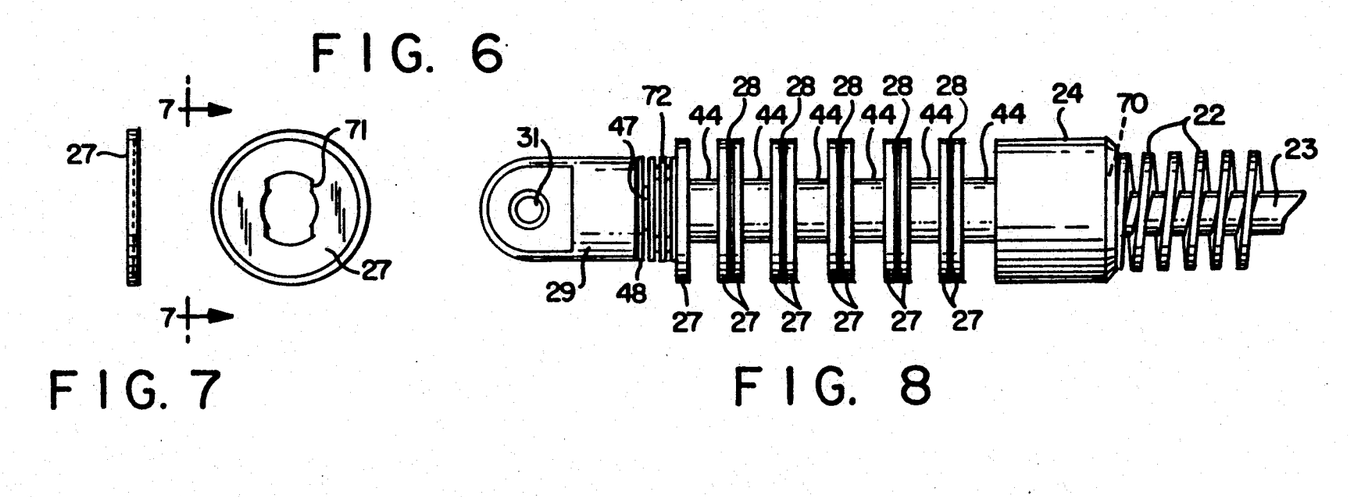
FIG. 6 is an enlarged elevational view of a loading spool flange used in the assembly of FIGS. 3 and 4.
FIG. 7 is an elevational view of the loading spool flange taken along the lines 7—7 in FIG. 6.
FIG. 8 is an enlarged side elevational view of the transmission assembly showing the series of loading spools with the driving sprockets removed for clarity.

FIGS. 3 and 4 further illustrate the geometry of the three piece loading spool design. It may be seen particularly that drive sprocket 26 is freely mounted to load bearing hub 44 through shell type overrunning clutch 43. Seals 51 are mounted to loading flanges to prevent debris from entering the mechanism. FIGS. 6 and 7 show a loading flange 27 in greater detail and further illustrate cutaway or notch 71 which serves as a means of coupling the flange to the load bearing hub 44 via protuberances 75 (see (FIG. 2b). It should be apparent that torque transmittal may also be achieved by other means such as by use of splined or polygon formed couplings.

It may also be seen particularly from FIG. 2 that a number of loading spools of the type shown in FIG. 1 are mounted in series on drive shaft 23, each of which supports a drive sprocket 26 through a commercially available shell type overrunning clutch 43. It may be further noted that a torsion disk 28 is inserted between each of the loading spools. The last loading flange 27 in the stack contacts a fifth thrust bearing assembly 72 which loads against retaining ring 47 (see FIG. 2b). A thrust washer 48 is mounted just prior to the rear bearing support 29.

A circular drive plate 25 is coupled to the wheel as best illustrated in FIGS. 1 and 2. The drive plate 25 is affixed to a circular backer plate 38 of lesser diameter, mounted to free wheel 42 which in turn couples directly to wheel hub 41 thereby linking spokes 7, rim 6, and tire 5, to the drive.

The drive plate 25 includes a series of holes 73 provided within the surface of the plate. The holes are arranged in circular patterns as shown in FIG. 1 which are concentric with the axle 31 of the wheel.

Drive sprockets 26 simultaneously engage a plurality of the holes, each sprocket engaging its respective circular pattern in drive plate 25, thereby transferring rotational power from the shaft 23 to the wheel.

It should be noted that rear bearing support 29 is linked directly to the rear axle 31 and is secured by retaining nuts 32 which also secure the same to the dropout plates 8 of the frame. Thus, as noted above, the entire transmission assembly is built from a common datum plane which assures accuracy and stability.

Figure 9:
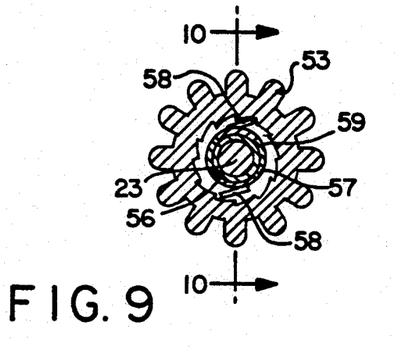
FIG. 9 is an enlarged side elevational view of an alternate sprocket design comprising a ratchet type overrunning clutch supported by a two piece loading spool.
Figure 10:
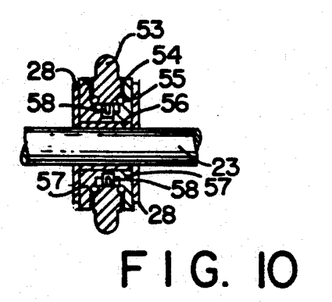
FIG. 10 is a sectional view taken along lines 10—10 of FIG. 9.

FIGS. 9 and 10 show an alternative modification of the invention wherein a two piece design loading hub is used. This design more closely approximates the free wheel type overrunning clutches commonly found driving the rear hubs of most bicycles today. As shown, the alternative type drive sprocket 53 is supported by ball bearings 55 which are in turn supported by alternate form loading spool halves 57. The loading spool halves 57 interlock with each other to form a torsional coupling. Further, an internal ratchet form as shown in the drive sprocket 53 (see FIG. 9) is driven by the modified loading spool halves 57 through ratchet pawl 58. Like the aforementioned three piece design, the loading spool is supported by a sleeve bearing 56 and is protected by seals 54 similar to the seals 51 in FIG. 4. It should be apparent that this design is also free to overrun in the opposite direction.

Having set forth the construction of an automatic transmission according to the invention, its operation may now be described. Power input is derived by means of the rider pedaling the crank mechanism thereby driving the crank spindle 36 in clockwise rotation as viewed in FIG. 1. With crank coupling 10 secured to crank spindle 36, it is compelled to follow directly the rotational motion of the crank spindle 36, and drives in turn bevel gear 11 through screw fasteners 35.

With bevel gear 11 following crank spindle 36 in matched rotation, it may be seen that bevel pinion 12, being engaged to bevel gear 11, will follow with an angular velocity directly proportional to the crank spindle angular velocity.

Bevel pinion 12 being coupled to drive shaft 23 through key 37 then causes drive shaft 23 to rotate at matched velocity.

It will be seen that any axial load issued by bevel pinion 12 is borne by bearing support 13 through thrust bearing assembly 30. Bearing support 13 therefore satisfies two requirements, the second being maintaining the rigid axial support of bevel pinion 12 through shell bearing 46 and drive shaft 23 for proper engagement to bevel gear 11.

Clamping collar 14 locates the drive shaft axially, and bears loosely upon thrust washer 62 and subsequently against bearing support 13. A second thrust washer 50 buffers clamping collar 14 from contact with retaining ring 49 (see FIG. 2a).

It may be seen that the jack assembly comprising jack base tube 16 and jack extension tube 17 may be activated by means of a cable mechanism as shown in FIG. 1. In this mechanism, a cable 21 is wrapped around the extension tube 17 with a pitch commensurate with that of the threaded engagement between jack extension tube 17 and jack base tube 16. Cable ends are then threaded through unloading cable sheath 18 and loading cable sheath 19 secured to chainstay 3 by cable anchor 20, ultimately being driven by a handgrip type driver on the handle bars. Other appropriate means may be used to activate the jack including, for example, a worm to wormgear combination. Note that jack stay 15 prevents jack base tube 16 from rotating during activation.

Upon loading the axial jack assembly, it will be seen that the load is borne by retaining ring 49 through thrust bearing assembly 65 (see FIG. 2a), and on the opposite end by compression spring 22 through thrust bearing assembly 69.

Use of compression spring 22 provides a means of applying a progressively increasing or decreasing axial load through a suitable linear displacement device such as the loading jack assembly. With this in mind, it may be seen that compression spring 22 effects a load on lead sprocket driver 24 through the thrust bearing assembly 70. The need for axial freedom of lead sprocket driver 24 becomes apparent as the load is directed through the driver 24 and onto the subsequent spool stack.

The spool closest to rear axle 31 loads up against thrust bearing assembly 72 then sustained by retaining ring 47 (see FIG. 2b). Thrust washer 48 simply buffers retaining ring 47 from rear bearing support 29. Note that all axial loading effected by the jack assembly is borne by retaining rings 47 and 49. This results in a desirable "balanced" axial loading condition.

Figure 5:
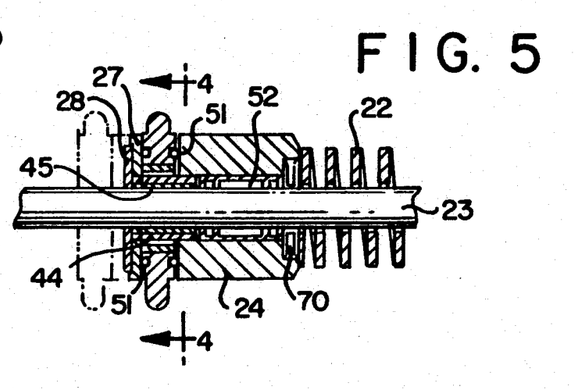
FIG. 5 is an enlarged sectional view of the leading sprocket shown in the assembly of FIG. 2, also illustrating a driving roller clutch/roller bearing assembly as an optional means to drive the lead sprocket.

While bevel pinion 12 is rigidly affixed to drive shaft 23 via key 37, lead sprocket driver 24 must be allowed axial freedom while maintaining torsional rigidity. Lead sprocket driver 24 may therefore be coupled to the drive shaft 23 by means of key 39, or by a spline or polygon form in lieu of key 39. FIG. 5 depicts an alternate method of "clutching" the lead sprocket driver 24 to drive shaft 23. Here item 52 is a commercially available overrunning clutch/bearing combination (available through INA Bearing Company, Inc.) While there is no question that this type of unit will deliver sufficient torque to the drive, backpedaling would be necessary to maintain axial freedom thereby making this type of unit less desirable for the application.

It is important to understand how torque is transmitted to the contributing drive sprockets. To this end, attention is directed to FIG. 8 wherein all contributing drive sprockets 26 have been removed to clearly show the loading path through the mechanical circuit. With lead sprocket driver 24 placed under axial load, it may be seen that the series of load bearing spools as depicted in FIG. 11 will be placed under the same axial load. Torsional output is therefore held constant from spool to spool. Hence the higher the degree of axial loading, the greater the torsional output to the spools.

Figure 12:
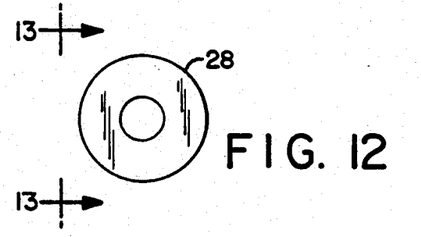
FIG. 12 is an enlarged elevational view of a torsion disk as shown in FIGS. 2, 4, 5, 8, 10 and 11.
Figure 13:
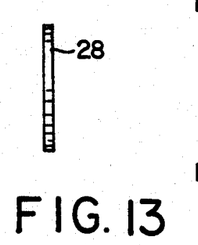
FIG. 13 is an elevational view of the torsion disk taken along lines 13—13 of FIG. 12.
Figure 14:
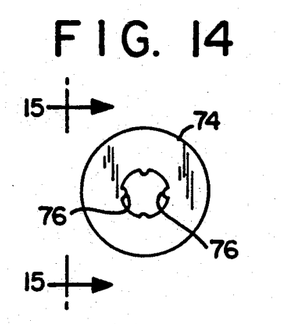
FIG. 14 an enlarged elevational view of an optional torsion disk design which engages the drive shaft as shown in FIG. 16.
Figure 15:
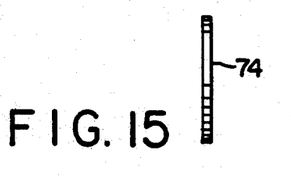
FIG. 15 is an elevational view of the optional torsion disk taken through lines 15—15 of FIG. 14.
Figure 16:
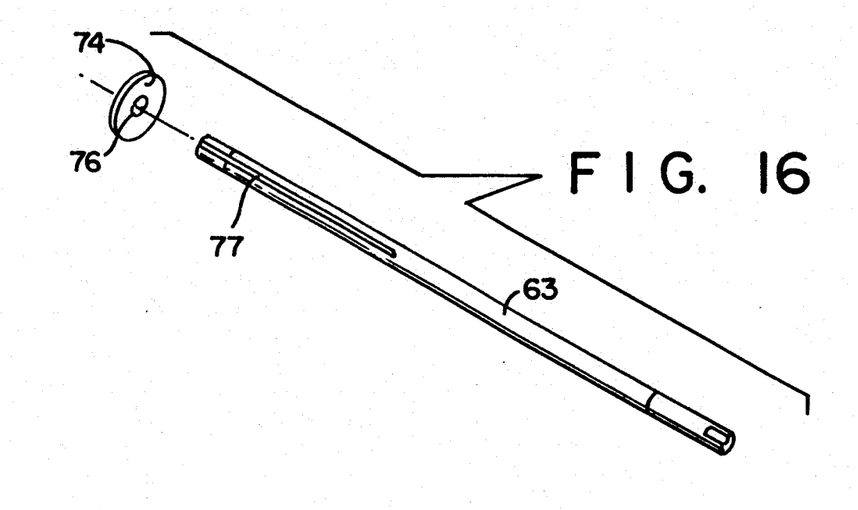
FIG. 16 is an illustrative isometric view of the optional design torsion disk shown in FIG. 14, depicting engagement on a receptive drive shaft.

Torsion disks 28 as illustrated in FIGS. 12 and 13 may be left free to rotate about drive shaft 23 in which case all resultant torsion is dependent upon the uniform coupling of sequential loading spools to torsion disks under compression. An optional method of driving the torsion disks is to couple the disks to the drive shaft 23 by means which will permit axial loading along the shaft. For example, as illustrated in FIGS. 14, 15 and 16, an alternate torsion disk 74 may be provided with a series of protuberances 76 which are spaced apart around its inner periphery and which are keyed to elongated slots 77 on the surface of the alternate drive shaft 63.

Referring again to FIG. 8, it may be seen that each spool in line is capable of transmitting a like torsional output. If overrunning sprockets 26 are now placed back onto their respective supporting spools, it may be shown that if that sprocket closest to the rear wheel satisfies the torsional requirements of the rear wheel, the other sprockets are being driven by drive plate 25 in a free wheeling mode of operation. If the rear wheel demands additional torque, the second sprocket from the rear wheel will assist the first. These two sprockets may then be called active or contributing sprockets, while all the others are allowed to freely overrun.

When two or more sprockets are driving, the frictional surfaces between their respective spools are slipping at a prescribed rate which is directly dependent upon the relative gear ratios. The drive is therefore highly efficient in the high speed mode whereby no frictional slippage occurs. Efficiency will drop progressively as additional gears assist to meet torsional demand, however, since the rider realizes a mechanical advantage as additional sprockets assist, the slight drop in output efficiency may be undetected.

It must be remembered that the lead sprocket is always clutched to the drive shaft (in the driving direction). Hence, a mechanical limit is set on the low speed ratio. It may be said that this sprocket will drive the rear wheel no matter what. If the axial load is removed from the stack altogether, the lead sprocket will still drive the bicycle. As the jack mechanism is activated, the axial load on the stack increases and the other sprockets in the stack begin to exert a torsional load on the drive plate. The greater the axial load, the more the sprockets closest to the rear axle will contribute while those farther away will start to overrun. The system automatically seeks a constant state of dynamic equilibrium.

Figure 17:
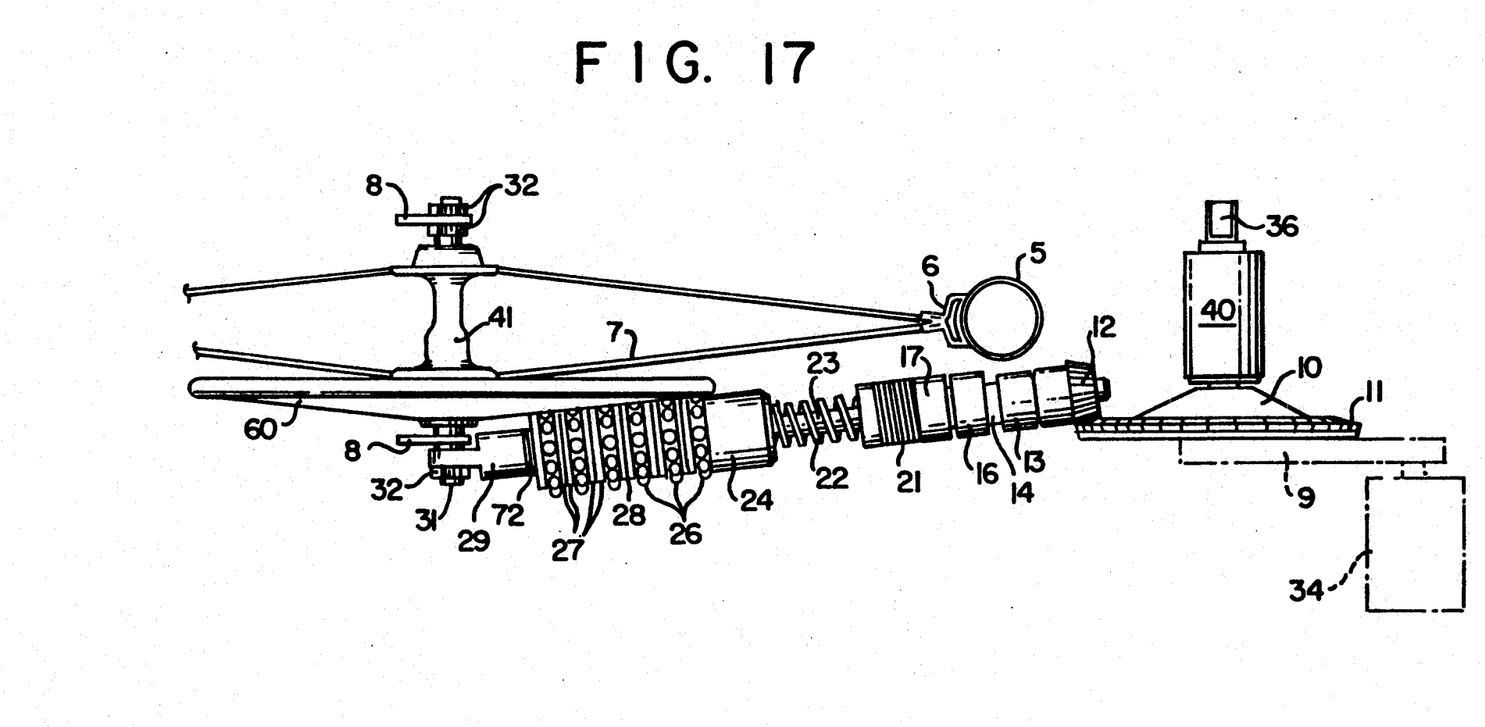
FIG. 17 is a view similar to FIG. 2 showing a modification of the invention.

FIG. 17 shows a modification of the invention wherein the device is nested closely to the frame of the bicycle. In such a case, the drive plate 60 is altered to a conic form to accommodate the cylindrical stack of driving sprockets. In order to utilize this modification, bevel gear 11 and bevel pinion 12 must be cut to accommodate the offset requirements of the drive.

Figure 18:
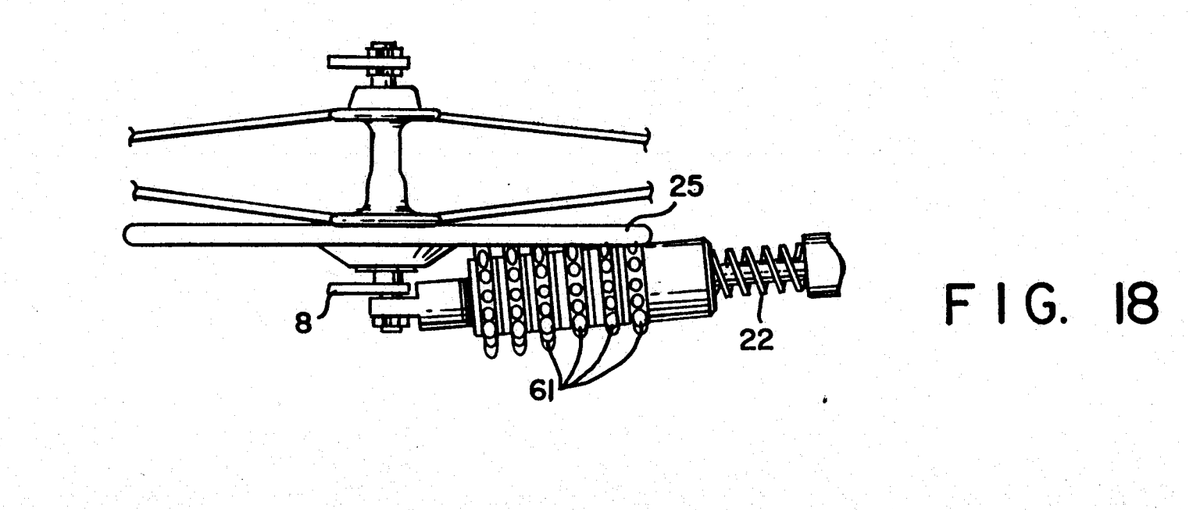
FIG. 18 is a similar view showing another modification.

FIG. 18 shows another modification of the invention wherein the device uses a conic stack of driving sprockets 61 engaging a planer drive plate 25. The advantage of this configuration is the ability to extend the gear range of the drive without increasing the diameter of the drive plate.

What is claimed is:

1. An automatic transmission for driving a rotating wheel having an axle mounted onto a support frame, said transmission comprising, in combination:
   a power input means mounted to said frame for receiving power input;
   a drive shaft rotatably mounted to said support frame;
   means for transmitting said power input from said power input means to said drive shaft causing said drive shaft to rotate;
   a plurality of driving elements mounted for rotation freely about said drive shaft in at least one direction and having engagement means on the surface thereof, one of said driving elements being a lead driver connected to said drive shaft for driven rotation along with said drive shaft, said driving elements being located at successively greater distances along said drive shaft from said axle with said lead driver being the farthest from said axle;
   a drive plate coupled to said rotating wheel and having a surface extending outwardly away from said axle, said drive plate having on said surface a plurality of concentrically arranged engagement means which mate simultaneously with said engagement means on said driving elements for transmitting rotational power from said drive shaft to said drive plate;
   means for transferring torsional thrust between said plurality of driving elements under axial load; and
   means for applying an axial load to said plurality of driving elements along said drive shaft.

2. An automatic transmission according to claim 1, wherein said support frame includes a first member supporting said power input means and a second member supporting said rotating wheel and said axle.

3. An automatic transmission according to claim 2, wherein said power input means comprises a dual crank mounted for rotation on said first frame member.

4. An automatic transmission according to claim 3, wherein said means for transmitting said power input comprises a bevel gear mounted to said dual crank and engaging a bevel pinion affixed to said drive shaft.

5. An automatic transmission according to claim 4, wherein said drive shaft is supported by first and second bearings, said first bearing being supported by a first bearing support in close proximity to said first frame member and said second bearing being supported by a second bearing support in close proximity to said second frame member.

6. An automatic transmission according to claim 5, wherein said drive shaft is also borne by said first bearing support through a first thrust washer and by said second bearing support through a second thrust washer.

7. An automatic transmission according to claim 1, wherein said engagement means on said driving elements are sprockets and wherein said engagement means on said drive plate are receptive holes arranged in concentric circles about said axle.

8. An automatic transmission according to claim 1, wherein each of said driving elements is rotatably supported within a loading spool including a sleeve bearing mounted on said drive shaft, a loading flange and a load bearing hub including means for engaging said loading flange under axial load.

9. An automatic transmission according to claim 1, wherein each of said driving elements is supported by a load bearing hub and wherein an overrunning clutch is interposed between said hub and said driving element.

10. An automatic transmission according to claim 1, wherein each of said driving elements is rotatably supported within a loading spool including a sleeve bearing mounted on said drive shaft, a pair of spool members, a ratchet pawl and ball bearings between said spool members and said driving element.

11. An automatic transmission according to claim 1, wherein each of said driving elements is supported by a loading spool including a bearing hub and a loading flange and wherein said means for transferring torsional thrust comprises a torsion disk disposed adjacent to said loading flange.

12. An automatic transmission according to claim 11, wherein said torsion disk is keyed to said drive shaft.

13. An automatic transmission according to claim 1, wherein said means for applying an axial load is adjustable.

14. An automatic transmission according to claim 13, wherein said means for applying an axial load comprises a compression spring mounted around said drive shaft and means for loading said spring in the axial direction.

15. An automatic transmission according to claim 14, wherein said loading means comprises a jack extension tube and a base tube mounted around said drive shaft, said base tube being threadably mounted inside said extension tube, said extension tube being connected to said compression spring.

16. An automatic transmission according to claim 1, wherein said means for transferring torsional thrust between said plurality of driving elements under axial load includes a torsion disk.

17. An automatic transmission for driving a rotating wheel having an axle mounted onto a support frame, said transmission comprising, in combination:
a power input means mounted to said frame for receiving power input;
a drive shaft rotatably mounted to said support frame;
means for transmitting said power input from said power input means to said drive shaft causing said drive shaft to rotate;
a plurality of driving elements mounted for rotation freely about said drive shaft in at least one direction and having engagement thereon, one of said driving elements being a lead driver connected to said drive shaft for driven rotation along with said drive shaft, said lead driver being free to move axially along said drive shaft;
drive plate coupled to said rotating wheel and extending outwardly away from said axle, said drive plate means having a plurality of concentrically arranged engagement means thereon which mate simultaneously with said engagement means on said driving elements for transmitting rotational power from said drive shaft to said drive plate means, the arrangement of said driving elements along said drive shaft being such that the engagement means on said lead driver mates with the concentrically arranged engagement means on said drive plate means located farthest from said axle;
means for transferring torsional thrust between said plurality of driving elements under axial load; and
means for applying an axial load to said plurality of driving elements concentrically along said drive shaft.

18. An automatic transmission for driving a rotating wheel having an axle mounted onto a support frame, said transmission comprising, in combination:
a power input means mounted to said frame for receiving power input;
a drive shaft rotatably mounted to said support frame;
means for transmitting said power input from said power input means to said drive shaft causing said drive shaft to rotate;
a plurality of driving elements mounted for rotation freely about said drive shaft in at least one direction and having engagement means on the surface thereof, one of said driving elements being a lead driver connected to said drive shaft for driven rotation along with said drive shaft, said driving elements being located at successively greater distances along said drive shaft from said axle with said lead driver being the farthest from said axle, said lead driver being free to move axially along said drive shaft;
a drive plate coupled to said rotating wheel and having a surface extending outwardly away from said axle, said drive plate having on said surface a plurality of concentrically arranged engagement means which mate simultaneously with said engagement means on said driving elements for transmitting rotational power from said drive shaft to said drive plate;
means for transferring torsional thrust between said plurality of driving elements under axial load; and
means for applying an axial load to said plurality of driving elements concentrically along said drive shaft.

19. An automatic transmission according to claim 18, wherein said means for transferring torsional thrust between said plurality of driving elements under axial load includes a torsion disk.

20. An automatic transmission for driving a rotating wheel having an axle mounted onto a support frame, said transmission comprising, in combination:
a power input means mounted to said frame for receiving power input, said support frame including a first member supporting said power input means and a second member supporting said rotating wheel and said axle, said power input means comprising a dual crank mounted for rotation on said first frame member;
a drive shaft rotatably mounted to said support frame, said drive shaft being supported by first and second bearings, said first bearing being supported by a first bearing support in close proximity to said first frame member and said second bearing being supported by a second bearing support in close proximity to said second frame member, said drive shaft being borne by said first bearing support through a first thrust washer and by said second bearing support through a second thrust washer;
means for transmitting said power input from said power input means to said drive shaft causing said drive shaft to rotate, said power input transmitting means comprising a bevel gear mounted to said dual crank and engaging a bevel pinion affixed to said drive shaft;

a plurality of driving elements mounted for rotation freely about said drive shaft in at least one direction and having engagement means on the surface thereof, one of said driving elements being a lead driver connected to said drive shaft for driven rotation along with said drive shaft, said driving elements being located at successively greater distances along said drive shaft from said axle with said lead driver being the farthest from said axle;

a drive plate coupled to said rotating wheel and having a surface extending outwardly away from said axle, said drive plate having on said surface a plurality of concentrically arranged engagement means which mate simultaneously with said engagement means on said driving elements for transmitting rotational power from said drive shaft to said drive plate;

means for transferring torsional thrust between said plurality of driving elements under axial load; and means for applying an axial load to said plurality of driving elements concentrically along said drive shaft.

21. An automatic transmission for driving a rotating wheel having an axle mounted onto a support frame, said transmission comprising, in combination:

a power input means mounted to said frame for receiving power input;

a drive shaft rotatably mounted to said support frame;

means for transmitting said power input from said power input means to said drive shaft causing said drive shaft to rotate;

a plurality of driving elements mounted for rotation freely about said drive shaft in at least one direction and having engagement means on the surface thereof, each of said driving elements being supported by a load bearing hub having an overriding clutch interposed between said hub and said driving element, one of said driving elements being a lead driver connected to said drive shaft for driven rotation along with said drive shaft, said driving elements being located at successively greater distances along said drive shaft from said axle with said lead driver being the farthest from said axle;

a drive plate coupled to said rotating wheel and having a surface extending outwardly away from said axle, said drive plate having on said surface a plurality of concentrically arranged engagement means which mate simultaneously with said engagement means on said driving elements for transmitting rotational power from said drive shaft to said drive plate;

means for transferring torsional thrust between said plurality of driving elements under axial load; and means for applying an axial load to said plurality of driving elements concentrically along said drive shaft.

22. An automatic transmission for driving a rotating wheel having an axle mounted onto a support frame, said transmission comprising, in combination:

a power input means mounted to said frame for receiving power input;

a drive shaft rotatably mounted to said support frame;

means for transmitting said power input from said power input means to said drive shaft causing said drive shaft to rotate;

a plurality of driving elements mounted for rotation freely about said drive shaft in at least one direction and having engagement means on the surface thereof, each of said driving elements being rotatably supported within a loading spool including a sleeve bearing mounted on said drive shaft, a pair of spool members, a ratchet pawl and ball bearings between said spool members and said driving element, one of said driving elements being a lead driver connected to said drive shaft for driven rotation along with said drive shaft, said driving elements being located at successively greater distances along said drive shaft from said axle with said lead driver being the farthest from said axle, a drive plate coupled to said rotating wheel and having a surface extending outwardly away from said axle, said drive plate having on said surface a plurality of concentrically arranged engagement means which mate simultaneously with said engagement means on said driving elements for transmitting rotational power from said drive shaft to said drive plate;

means for transferring torsional thrust between said plurality of driving elements under axial load; and means for applying an axial load to said plurality of driving elements concentrically along said drive shaft.

23. An automatic transmission for driving a rotating wheel having an axle mounted onto a support frame, said transmission comprising, in combination:

a power input means mounted to said frame for receiving power input;

a drive shaft rotatably mounted to said support frame;

means for transmitting said power input from said power input means to said drive shaft causing said drive shaft to rotate;

a plurality of driving elements mounted for rotation freely about said drive shaft in at least one direction and having engagement means on the surface thereof, each of said driving elements being supported by a loading spool including a bearing hub and a loading flange, one of said driving elements being a lead driver connected to said drive shaft for driven rotation along with said drive shaft, said driving elements being located at successively greater distances along said drive shaft from said axle with said lead driver being the farthest from said axle;

a drive plate coupled to said rotating wheel and having a surface extending outwardly away from said axle, said drive plate having on said surface a plurality of concentrically arranged engagement means which mate simultaneously with said engagement means on said driving elements for transmitting rotational power from said drive shaft to said drive plate;

means for transferring torsional thrust between said plurality of driving elements under axial load comprising a torsion disk disposed adjacent to said loading flange; and means for applying an axial load to said plurality of driving elements along said drive shaft.

24. An automatic transmission according to claim 23, wherein said torsion disk is keyed to said drive shaft.

25. An automatic transmission for driving a rotating wheel having an axle mounted onto a support frame, said transmission comprising, in combination:

a power input means mounted to said frame for receiving power input;

a drive shaft rotatably mounted to said support frame;

means for transmitting said power input from said power input means to said drive shaft causing said drive shaft to rotate;

a plurality of driving elements mounted for rotation freely about said drive shaft in at least one direction and having engagement means on the surface thereof, one of said driving elements being a lead driver connected to said drive shaft for driven rotation along with said drive shaft, said driving elements being located at successively greater distances along said drive shaft from said axle with said lead driver being the farthest from said axle;

a drive plate coupled to said rotating wheel and having a surface extending outwardly away from said axle, said drive plate having on said surface a plurality of concentrically arranged engagement means which mate simultaneously with said engagement means on said driving elements for transmitting rotational power from said drive shaft to said drive plate;

means for transferring torsional thrust between said plurality of driving elements under axial load; and means for applying an adjustable axial load to said plurality of driving elements along said drive shaft comprising a compression spring mounted around said drive shaft and means for loading said spring in the axial direction.

26. An automatic transmission according to claim 25, wherein said loading means comprises a jack extension tube and a base tube mounted around said drive shaft, said base tube being threadably mounted inside said extension tube, said extension tube being connected to said compression spring.

* * * * *